United States Patent
Jeong

(10) Patent No.: US 6,999,767 B1
(45) Date of Patent: Feb. 14, 2006

(54) METHOD FOR CONTROLLING HAND-OFF FOR HOME ZONE SERVICES IN A MOBILE COMMUNICATIONS SYSTEM

(75) Inventor: Jin-Soo Jeong, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 09/492,052

(22) Filed: Jan. 26, 2000

(30) Foreign Application Priority Data

Jan. 26, 1999 (KR) .................................. 99-2350

(51) Int. Cl.
*H04Q 7/20* (2006.01)
(52) U.S. Cl. .................... 455/439; 455/432.1; 455/436
(58) Field of Classification Search ................ 455/439, 455/432.1, 433, 435.1, 436, 437, 438, 421, 455/422.1, 426.1, 442, 462, 426.2
See application file for complete search history.

(56) References Cited

U.S. PATENT DOCUMENTS

| 5,802,468 | A | * | 9/1998 | Gallant et al. ............... 455/422 |
| 6,044,261 | A | * | 3/2000 | Kazmi ......................... 455/408 |
| 6,073,010 | A | * | 6/2000 | Dufour ........................ 455/422 |
| 6,212,390 | B1 | * | 4/2001 | Rune ........................... 455/456 |
| 6,405,038 | B1 | * | 6/2002 | Barber et al. ............... 455/434 |
| 6,546,253 | B1 | * | 4/2003 | Chow et al. ................. 455/439 |

FOREIGN PATENT DOCUMENTS

WO    WO 98/36602    8/1998

* cited by examiner

Primary Examiner—Erika A. Gary
(74) Attorney, Agent, or Firm—Cha & Reiter, L.L.C.

(57) ABSTRACT

A method for controlling the hand-off of an MS (Mobile Station) for the home zone service in a mobile telecommunications system including a plurality of BTSs (Base Transceiver Stations), a BSC for controlling the BTSs, and an MSC (Mobile Switching Center) for connecting the BSC with a different BTS or network, comprising the steps of causing the MS to connect through the BTS with the BSC (Base Station Controller) by an outgoing or incoming call, causing the BSC to store the home zone list and the subscriber service class of the MS received from the MSC, and causing the BSC to perform the hand-off requested by the MS according to the home zone list and the subscriber service class. Thus, when the MS registered only in the fixed network, so as to be provided with communication services only in the home zone, travels through the other regions than the home zone, the BTS drops the presently connected call with an alert message. However, the MS registered both in the fixed and in the mobile network, so as to be provided with communication services both in the home zone and in the other regions, travels through the other regions, the BTS only sends an alert message to the MS without dropping the presently connected call. In this case, the BTS operator has discretion as to whether to send the alert message to the MS.

8 Claims, 6 Drawing Sheets

METHOD FOR CONTROLLING HAND-OFF FOR HOME ZONE SERVICES IN A MOBILE COMMUNICATIONS SYSTEM

CLAIM OF PRIORITY

This application makes reference to, incorporates the same herein, and claims all benefits accruing under 35 U.S.C. Section 119 from an application for METHOD FOR CONTROLLING HAND-OFF FOR HOME ZONE SERVICES IN A MOBILE COMMUNICATIONS SYSTEM filed earlier in the Korean Industrial Property Office on the 26th day of Jan. 1999 and there duly assigned Serial No. 2350/1999.

BACKGROUND OF THE INVENTION

1. Field of the Invention

The present invention relates to a cellular mobile telecommunications system, and more particularly a method for controlling the hand-off for home zone services in such system.

2. Description of the Related Art

Generally, a cellular radio system provides communication service for mobile subscribers by dividing a geographical area into several, smaller, contiguous radio coverage areas called "cells", which are served by a series of fixed radio stations called "base stations." The base stations are connected to and controlled by a mobile service switching center (MSC). In this case, the term, "hand-off" means the process of enabling a mobile station (MS) to continue the existing mobile communication when the MS moves from one cell to another.

Referring to FIG. 1, a conventional cellular mobile telecommunications network comprises a plurality of base transceiver stations (BTS) 121 to 124 providing mobile telecommunication services to the MS 110, a base station controller (BSC) 130 for controlling the BTSs and the hand-off, an MSC 140 for connecting the BSC 130 to another BTS or PSTN (Public Switched Telephone Network), and a location registration system (LRS) 142 for storing the subscribers' information of all MSs registered in the mobile telecommunications system.

Meanwhile, a wireless local loop (WLL) connects the wireline telephone subscribers with the switching system by means of a wireless communications link in order to provide telephone services in areas where the wire lines for the PSTN may not be properly installed. Although the WLL is similar to the mobile telecommunications network in this respect, it does not provide mobile services such as hand-off but provides the wireline telephone services. Generally, the PSTN and the WLL are called "fixed network" while the cellular system and the personal communications system are called "mobile network." The fixed network is more advantageous in sound quality but may be used only in the region limited by the "home zone."

The concept of the home zone has been introduced in order to enable the mobile subscriber to utilize the MS as a cordless phone while traveling within a certain geographic location. If the mobile subscriber makes a call within his or her home zone, the MS functions as a conventional cordless phone and the mobile subscriber is not charged for the air time. Accordingly, within his or her home zone, the mobile subscriber can utilize the MS to originate outgoing calls without incurring expensive air time charges and without physically using a different telephone terminal, e.g., a wireline terminal such as a cordless phone. However, the conventional home zone service does not provide for the hand-off, so that the presently connected call is dropped when an MS registered for both the mobile network and the fixed network is travelling between the home zone and other regions. Hence, after completing the movement into a different region, the MS must make an attempt to reconnect the dropped call.

SUMMARY OF THE INVENTION

It is an object of the present invention to provide a method for controlling the hand-off for the home zone service according to the information of the home zone list and the service level of an MS while traveling between the home zone and the other regions.

According to one aspect of the present invention, a method for controlling the hand-off of an MS for the home zone service in a mobile telecommunications system of the type having a plurality of BTSs, a BSC for controlling the BTSs, and an MSC for connecting the BSC with a different BTS or network, the method comprising the steps of causing the MS to connect through the BTS with the BSC by an outgoing or incoming call; causing the BSC to store the home zone list and subscriber service class of the MS received from the MSC; and, causing the BSC to selectively perform the hand-off requested by the MS according to the home zone list and the subscriber service class. Thus, when an MS registered only in the fixed network so as to be provided with communication services in the home zone travels through the other regions other than the home zone, the BTS drops the presently connected call with an alert signal. However, an MS registered for both the fixed and the mobile network, so as to be provided with communication services both in the home zone and other regions, travels through the other regions, the BTS only sends an alert signal to the MS without dropping the presently connected call. In this case, the BTS operator has discretion as to whether to send the alert signal to the MS.

The present invention will now be described more specifically with reference to the attached drawings only by way of example.

A BRIEF DESCRIPTION OF THE ATTACHED DRAWINGS

A DETAILED DESCRIPTION OF THE PREFERRED EMBODIMENT

Figure 1:
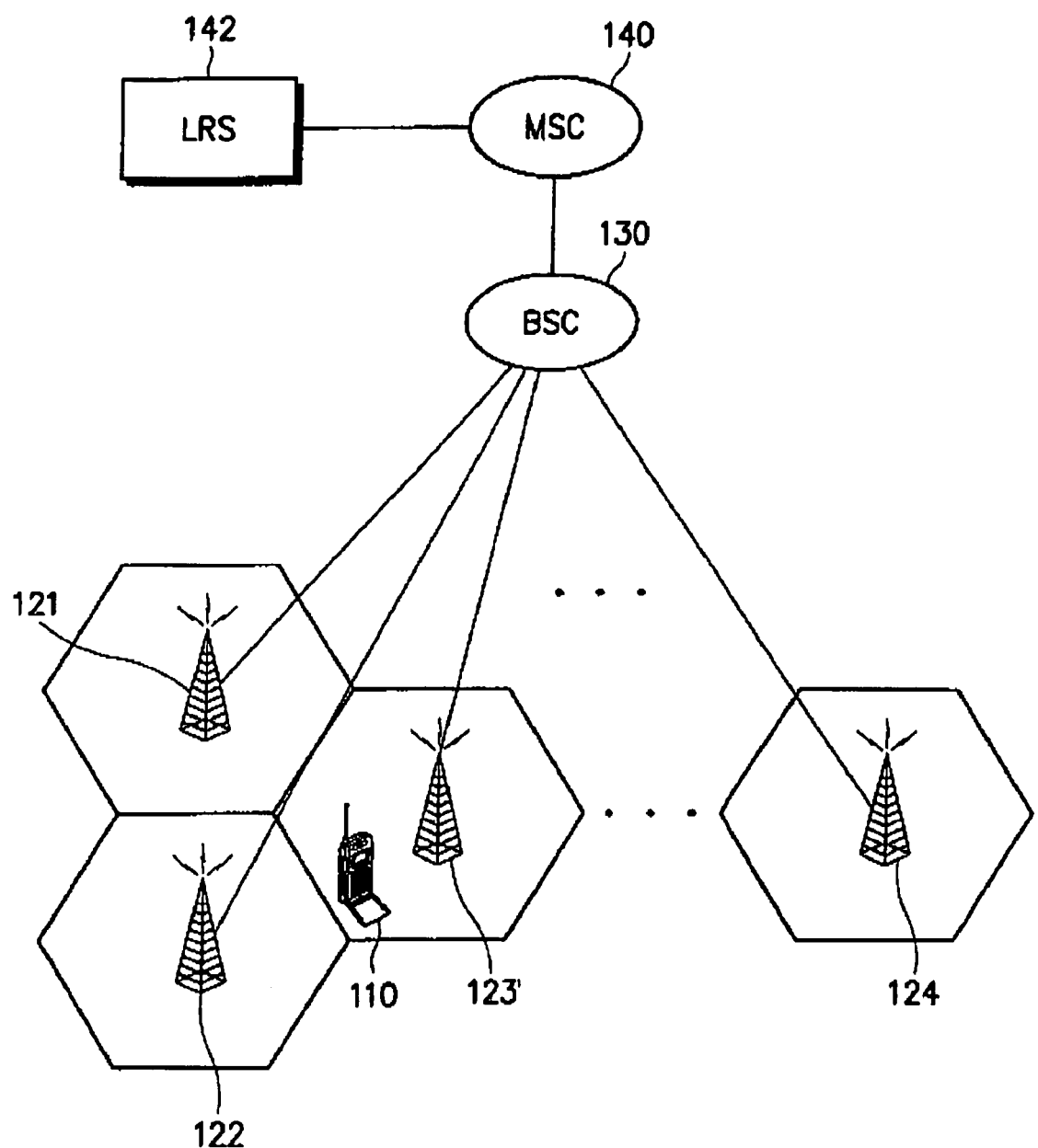
FIG. 1 is a schematic diagram for illustrating the structure of a conventional cellular mobile telecommunications network.
Figure 2:
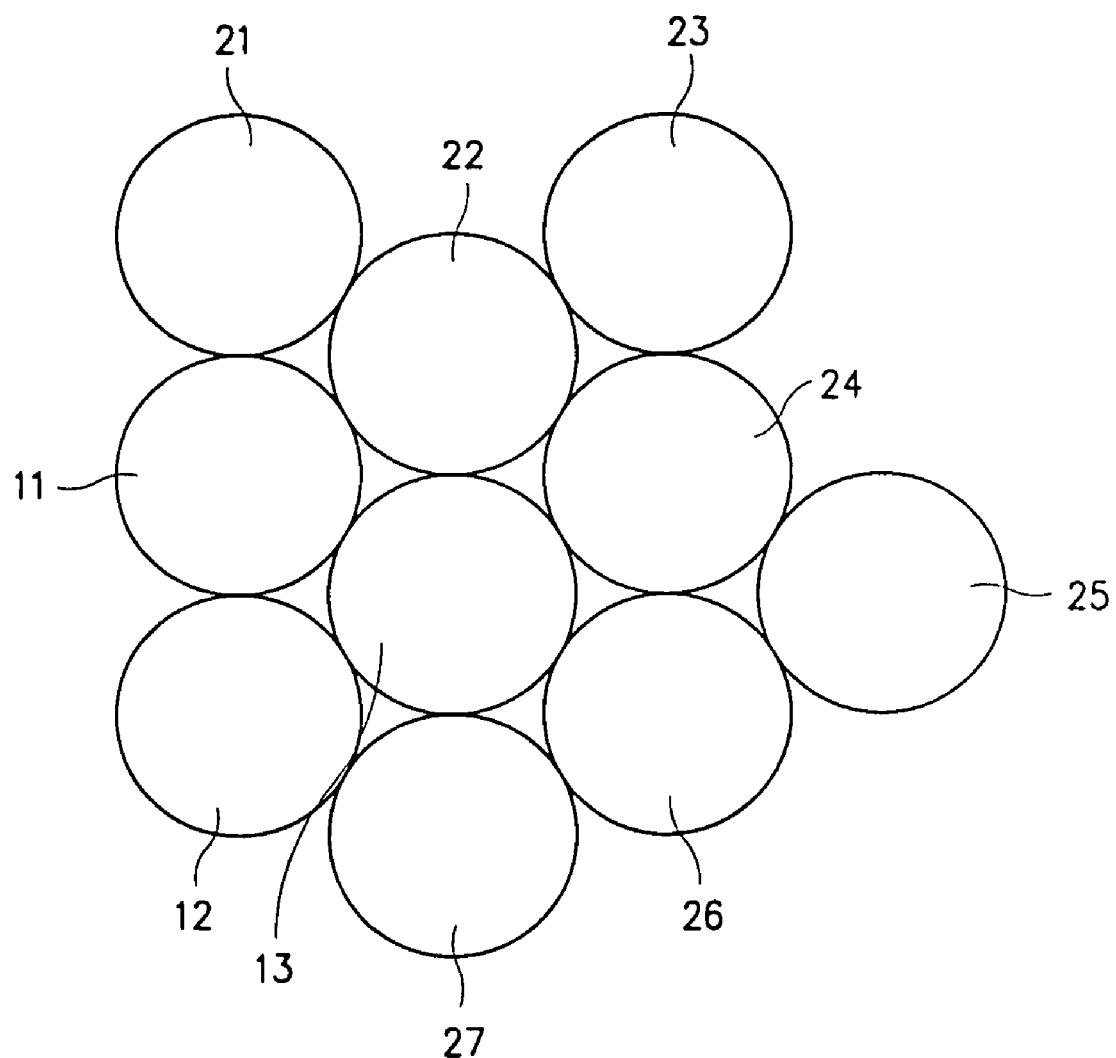
FIG. 2 is a schematic diagram for showing the home zone and other regions provided with the hand-off service according to the present invention.

For the application of the present invention, the MSC or HLR (Home Location Register) should have a data base storing the home zone list specifying information concerning the home zone of each MS, so that the MSC may search out the service class of the MS from the data base to determine whether the MS is registered in the fixed network or mobile network, or in both. Referring to FIG. 2, the cells indicated by reference numerals 11 to 13 represent the home zones, and the reference numerals 21 to 27 represent the other regions not being the home zone. The BTSs of the other cells 21 to 27 are registered in the data base.

Figure 3:
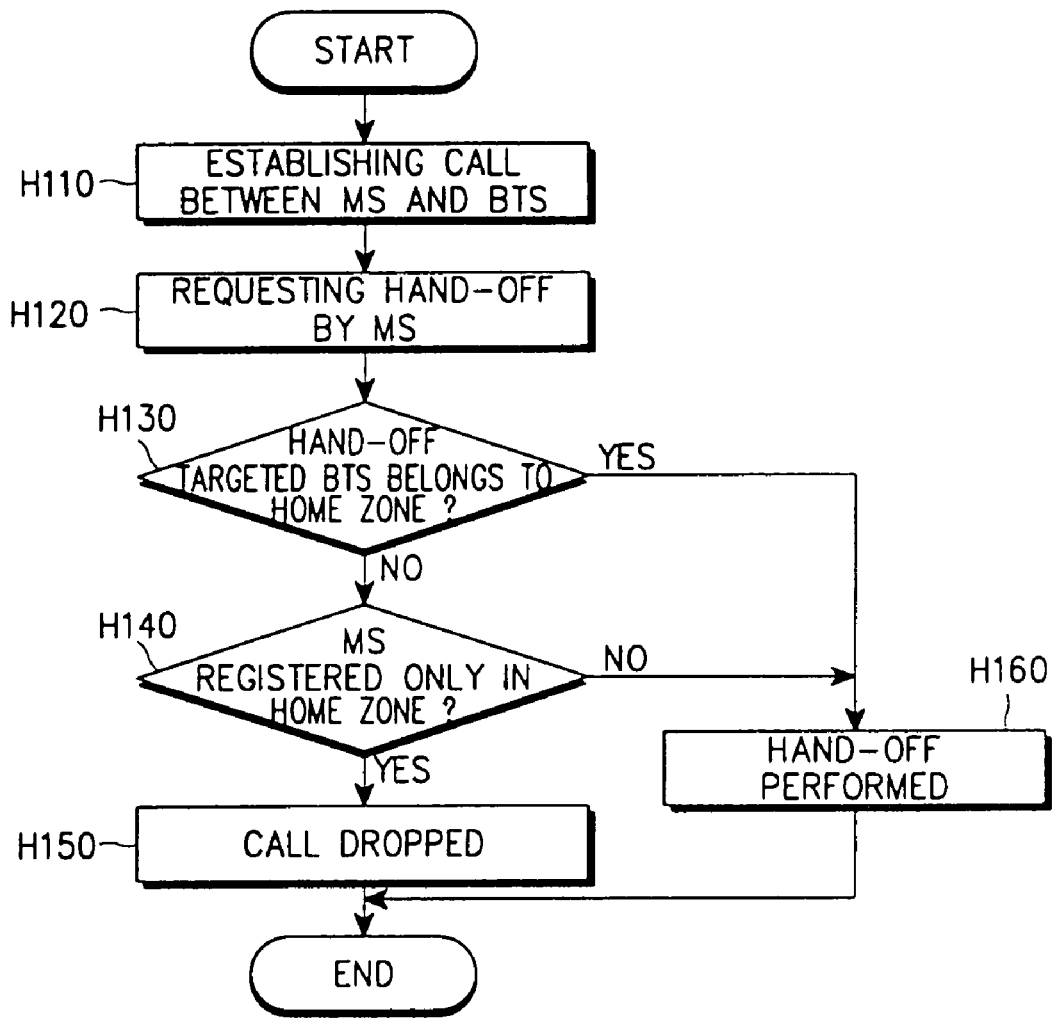
FIG. 3 is a flow chart for illustrating the process of controlling the hand-off of the MS according to an embodiment of the present invention.

Describing the operational principle of the invention in connection with FIG. 3, controlling the hand-off comprising the steps of establishing a call connection between the MS and the BTS providing the home zone service, in H110; causing the MS to request the hand-off in H120; determining whether the hand-off targeted BTS belongs to the home zone in H130; determining whether the MS is registered to be used only in the home zone when the hand-off targeted BTS does not belong to the home zone in H140; dropping the call connection when the MS is registered to be used only in the home zone in HI 50; and, performing the hand-off of the MS when the hand-off targeted BTS belongs to the home zone or when the MS is registered to be used both in the home zone and the other non-home zone regions, in H160. Hereinafter, these steps are more specifically described.

Figure 4:
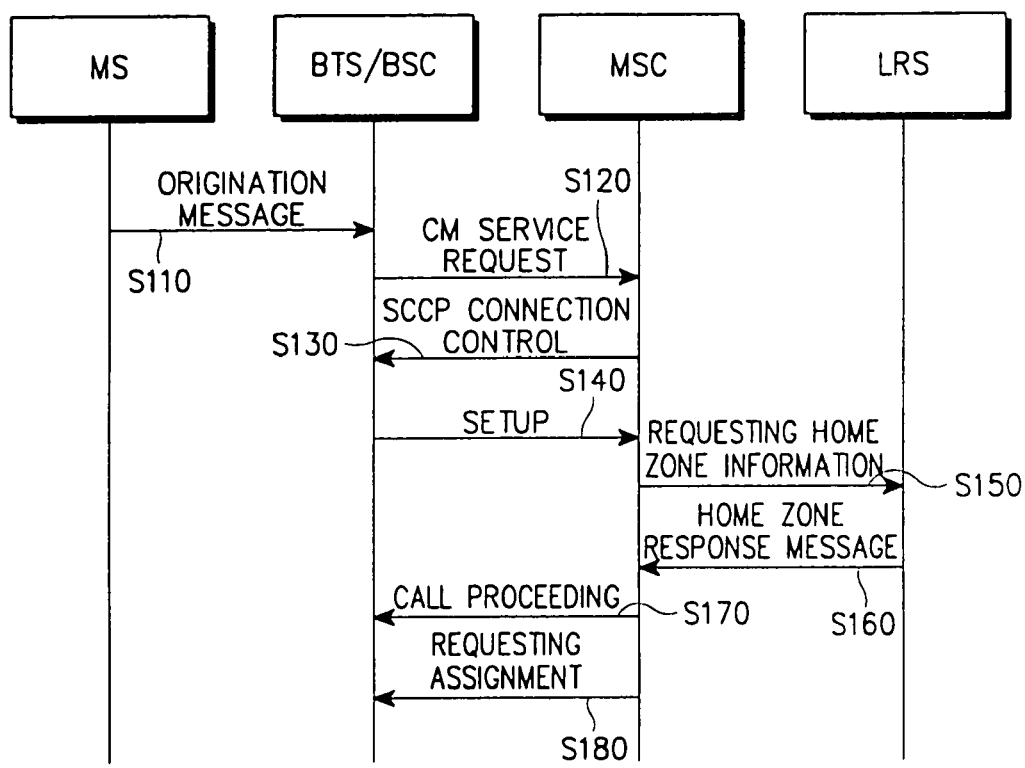
FIG. 4 is a flow chart for illustrating the steps for the MS to make an outgoing call according to the present invention.

In step H110, when the MS is connected with the BTS providing the home zone service through an outgoing or an incoming call, the BTS registers the home zone information of the MS received from the MSC. The home zone information includes the home zone list and the subscriber service class of the MS, and this information is used for the BSC to determine the hand-off of the MS. In this case, the home zone list indicates the list of the cells providing the home zone service to the MS and the subscriber service class as to whether the MS is registered in the fixed network or mobile network, or both. Namely, the BSC determines whether the MS may receive the communications service only in the home zone or both in the home zone and the other regions based on the subscriber service class information. The procedure of the BTS for registering the home zone information is as follows:

Referring to FIG. 4, the subscriber operates the MS to send an origination message containing the information of the MS including the termination number to the BTS and the BSC, thus providing the home zone service in step S110. Then, the BTS and the BSC send a control message service request message (CM Message) to the MSC in step S120, and receive a SCCP (Signaling Connection Control Part) connection control message from the MSC in step S130. The BTS and the BSC send a setup message (SM) to the MSC in step 140 in order to establish the communication channel.

Subsequently, the MSC sends the home zone request message to a location registration system (LRS) such as HLR and VLR (Visitor Location Register) or another data base system, in step S150, to request the home zone information of the MS. The LRS retrieves the home zone information of the MS from the subscribers' information data base using the ID number of the MS, and loads the home zone information on the home zone response message that is transferred to the MSC in step S160. Then, the MSC loads the home zone information on a call proceeding message as specified in TSB-80, IS-634A, and IS-634B and transfer to the BST/BSC in step S170. The home zone information contained in the message is registered in step s180. Accordingly, the BTS/BSC registers the home zone information received from the MSC at each call in order to control the hand-off.

Referring again to FIG. 3, when the MS requests the BSC to perform the hand-off to the hand-off targeted BTS in step H120, it also sends a pilot strength measurement message (PSMM) to the BSC. This is performed when the MS moves to another BTS region or the pilot signal strength of the other BTS region becomes equal to or greater than that of the presently servicing BTS due to the change in the radio environment. The PSMM contains the information of all the pilot signals that the MS may presently receive. The pilot signal consists of the PN (Pseudo random Noise) code and each BTS has the inherent time offset for the PN code. Hence, the MS loads the PN offset of all the received pilot signals on the PSMM transferred to the BSC, which analyzes the strengths of the pilot signals contained in the PSMM to determine the hand-off of the MS.

Receiving the hand-off request, the BSC retrieves the home zone information of the MS to determine in step H130 whether the hand-off targeted BTS is included in the home zone list of the MS. If it is not included in the home zone list, the BSC additionally retrieves the subscriber service class of the MS in step H140 to determine whether the MS is registered for use only in the home zone. If the MS is only for use in the home zone, the BSC does not hand off the MS to the targeted BTS and drops the present call in step H150.

Figure 5:
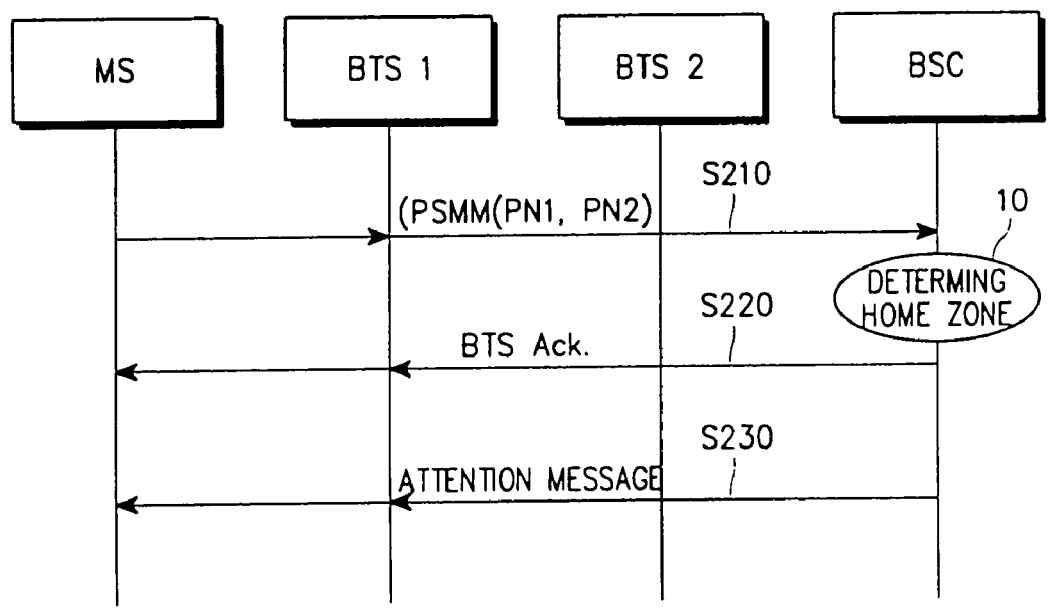
FIG. 5 is a flow chart for illustrating the hand-off procedure of the MS according to an embodiment of the present invention; and, FIG. 6 is a flow chart for illustrating the hand-off procedure of the MS according to another embodiment of the present invention.

The hand-off procedure of the MS is described in connection with FIG. 5. When the MS in connection with a first BTS that provides the home zone service moves into a second BTS region, the MS sends, in step S210, the PSMM containing the PN offset PN1 of the first BTS and the PN offset PN2 of the second BTS through the first BTS to the BSC. The BSC analyzes the PSMM (PN1, PN2) to determine the home zone as represented by reference numeral 10 in step S210. If the hand-off targeted second BTS is not included in the home zone list and the MS may be provided with the service only in the home zone, the BSC sends the base station an acknowledgment (BS Ack) message through the first BTS to the MS to no longer transmit the PSMM (PN1, PN2), thus dropping the present call. In this case, the BSC may send an alert or a flash message to the MS and outputs a series of certain characters or tones contained in the message to inform the subscriber about the dropping of the call. On the contrary, if the hand-off targeted BTS belongs to the home zone, or the MS is registered for use both in the home zone and the other regions with the hand-off targeted BTS not belonging to the home zone, the BSC hands off the MS to the targeted BTS while maintaining the present call.

Figure 6:
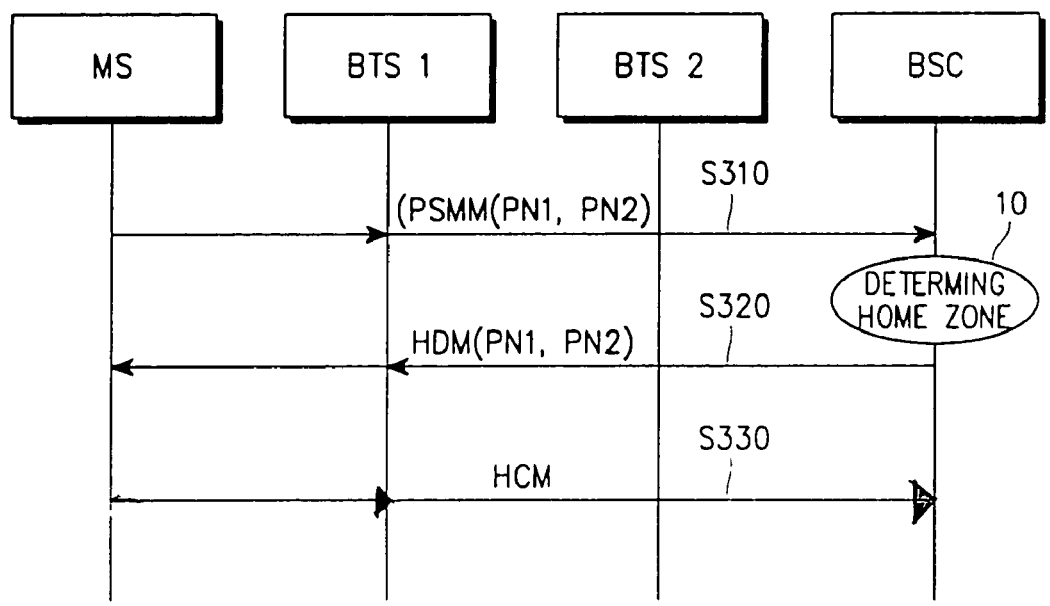

Another embodiment of controlling the hand-off is illustrated in connection with FIG. 6. When the MS in connection with a first BTS providing the home zone service moves into a second BTS region, the MS sends in step S310 the PSMM containing the PN offset PN1 of the first BTS and the PN offset PN2 of the second BTS through the first BTS to the BSC, which analyzes the PSMM (PN1, PN2) to determine the home zone as represented by the reference numeral 10. If the hand-off targeted second BTS belongs to the home zone, or the MS is registered for use both in the home zone and the other regions with the hand-off targeted BTS not belonging to the home zone, the BSC sends the hand-off direction message HDM (PN1, PN2) through the first BTS to the MS in step S320. In this case, as the HDM (PN1, PN2) includes both offsets the PN1 and the PN2 of the first and the second BTSs, the MS determines that the first and the second BTSs are added together. Subsequently, the MS establishes the communication channels with both BTSs, sending the hand-off completion message HCM through the first BTS to the BSC in step S330.

Thus, the present invention enables one MS to be used both in the home zone and in the other regions by controlling the hand-off. While the present invention has been described in connection with specific embodiments accompanied by the attached drawings, it will be readily apparent to those skilled in the art that various changes and modifications may be made thereto without departing from the gist of the present invention.

What is claimed is:

1. A method for controlling a hand-off of an MS (Mobile Station) for home zone service in a mobile telecommunications system, comprising the steps of:

(a) establishing a call connection between said MS and a BTS (Base Transceiver Station) providing the home zone service, wherein a home zone pertaining to the home zone service is defined by a fixed network in which the MS is further registered for use;

(b) requesting a BSC (Base Station Controller) to make the hand-off to a hand-off targeted BTS via said BTS;

(c)(i) causing said BSC to receive a home zone information of said MS from an MSC (Mobile Switching Center) wherein the home zone information pertains to said home zone and includes a home zone list and a subscriber class of said MS;

(c) (ii) causing said BSC to determine whether the hand-off targeted BTS belongs to the home zone using the home zone list;

(d) (i) performing the hand-off of said MS to said hand-off targeted BTS if said hand-off targeted BTS belongs to the home zone;

(d)(ii) determining whether said MS is registered to be used only in the home zone or not by retrieving the subscriber class when said hand-off targeted BTS does not belong to the home zone;

(e) dropping said call connection if said hand-off targeted BTS does not belong to the home zone and if said MS is registered to be used only in the home zone service; and, (f) performing the hand-off of said MS to said hand-off targeted BTS if said hand-off targeted BTS does not belong to the home zone and said MS is registered to be used both in the home zone service and a non-home zone service.

2. The method as defined in claim 1, wherein the step (a) of establishing said call connection further includes the steps of:

(g) causing said BSC to request the home zone information of said MS from a MSC (Mobile Switching Center) in response to a request to establish said call connection between said MS and said BTS;

(h) causing said MSC to send the home zone information to said BSC; and, (i) storing the home zone information in said BSC.

3. The method as defined in claim 2, wherein the home zone information includes a home zone list having a plurality of BTSs providing the home zone service to said MS and a subscriber class information specifying whether said MS is registered to be used in the non-home zone service.

4. The method as defined in claim 2, wherein the step (h) of sending the home zone information from said MSC to said BSC is achieved through a call proceeding message.

5. The method as defined in claim 2, wherein the home zone information is stored in a database.

6. The method as defined in claim 5, wherein the database is stored in an LRS (Location Registration System).

7. The method as defined in claim 1, wherein the step (e) of dropping said call connection further includes the steps of sending a BTS acknowledging signal to said MS, sending a warning message to said MS, and causing said MS to output said warning message to inform the subscriber of said MS.

8. The method as defined in claim 7, wherein said warning message comprises either one of visual characters, tones, and flash light.

* * * * *